US008799424B2

(12) United States Patent
Fitzpatrick et al.

(10) Patent No.: US 8,799,424 B2
(45) Date of Patent: *Aug. 5, 2014

(54) TRANSPARENT HETEROGENOUS LINK PAIRING

(71) Applicant: International Business Machines Corporation, Armonk, NY (US)

(72) Inventors: Michael Gerard Fitzpatrick, Raleigh, NC (US); Jeffrey D Haggar, Holly Springs, NC (US); Hugh E Hockett, Raleigh, NC (US); Maurice Isrel, Jr., Raleigh, NC (US); Jerry W Stevens, Raleigh, NC (US); Todd Elsworth Valler, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/789,946

(22) Filed: Mar. 8, 2013

(65) Prior Publication Data

US 2013/0204985 A1 Aug. 8, 2013

Related U.S. Application Data

(63) Continuation of application No. 13/155,153, filed on Jun. 7, 2011, now Pat. No. 8,650,300.

(51) Int. Cl.
*G06F 15/177* (2006.01)
*H04L 12/28* (2006.01)

(52) U.S. Cl.
USPC .......................................... 709/220; 370/254

(58) Field of Classification Search
USPC ....................................................... 709/220
See application file for complete search history.

(56) References Cited

U.S. PATENT DOCUMENTS

| | | | |
|---|---|---|---|
| 6,314,525 B1* | 11/2001 | Mahalingham et al. | 714/4.12 |
| 6,400,730 B1* | 6/2002 | Latif et al. | 370/466 |
| 6,687,758 B2 | 2/2004 | Craft et al. | |
| 6,993,584 B2* | 1/2006 | Border et al. | 709/227 |
| 7,337,233 B2* | 2/2008 | Dillon | 709/232 |
| 7,809,847 B2 | 10/2010 | Boucher et al. | |
| 7,921,177 B2 | 4/2011 | Raisch et al. | |
| 2002/0065963 A1* | 5/2002 | Lehmann et al. | 710/38 |
| 2004/0015966 A1* | 1/2004 | MacChiano et al. | 718/1 |
| 2006/0029097 A1* | 2/2006 | McGee et al. | 370/468 |
| 2010/0138567 A1 | 6/2010 | Haggar et al. | |
| 2011/0072427 A1 | 3/2011 | Garmark | |
| 2011/0078680 A1 | 3/2011 | Lagergren et al. | |

OTHER PUBLICATIONS

Cisco Systems, Inc.;How Does Link Aggregation Work; Document ID 108906; Dec. 12, 2008; http://www.cisco.com/en/US/products/ps9967/products_qanda_item09186a0080a36439.shtml.

* cited by examiner

Primary Examiner — Guang Li

(74) Attorney, Agent, or Firm — David Mims; Robert C. Rolnik

(57) ABSTRACT

A method, system and computer program product for managing at least two physical links. A TCP/IP stack configures a first interface with attributes. The TCP/IP stack activates the first interface. The TCP/IP stack detects a channel path identifier (CHPID). The TCP/IP stack creates a second interface. The TCP/IP stack associates the second interface with the first interface. The first interface and the second interface are logically linked to exchange traffic corresponding to a single internet protocol address. The TCP/IP stack configures the second interface with at least one attribute. The TCP/IP stack activates the second interface. The two physical links may rely on two different physical link types.

9 Claims, 6 Drawing Sheets

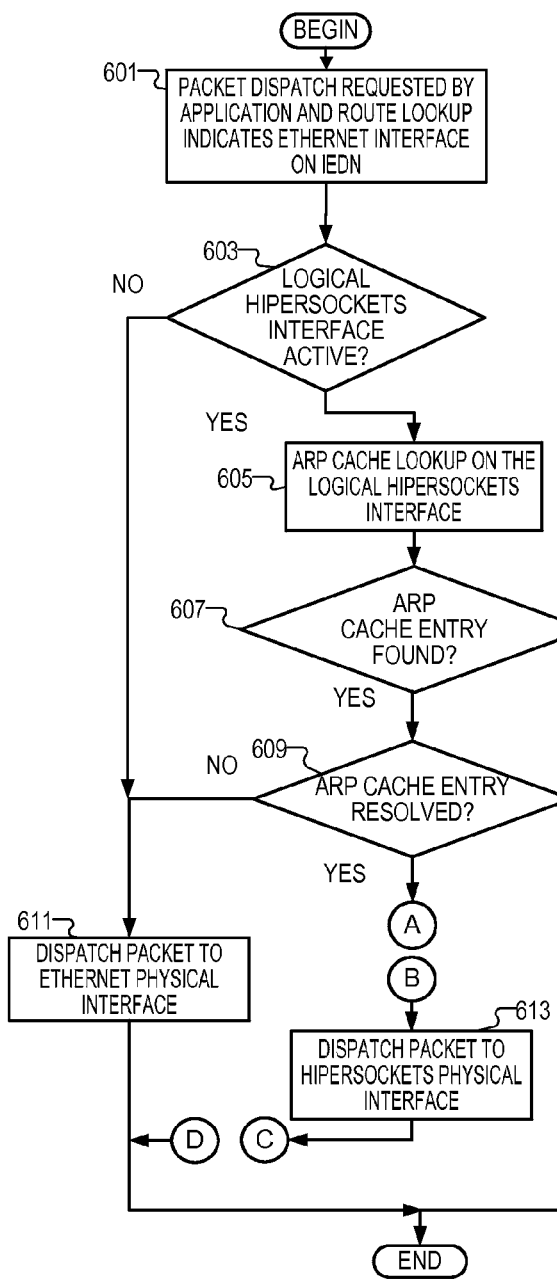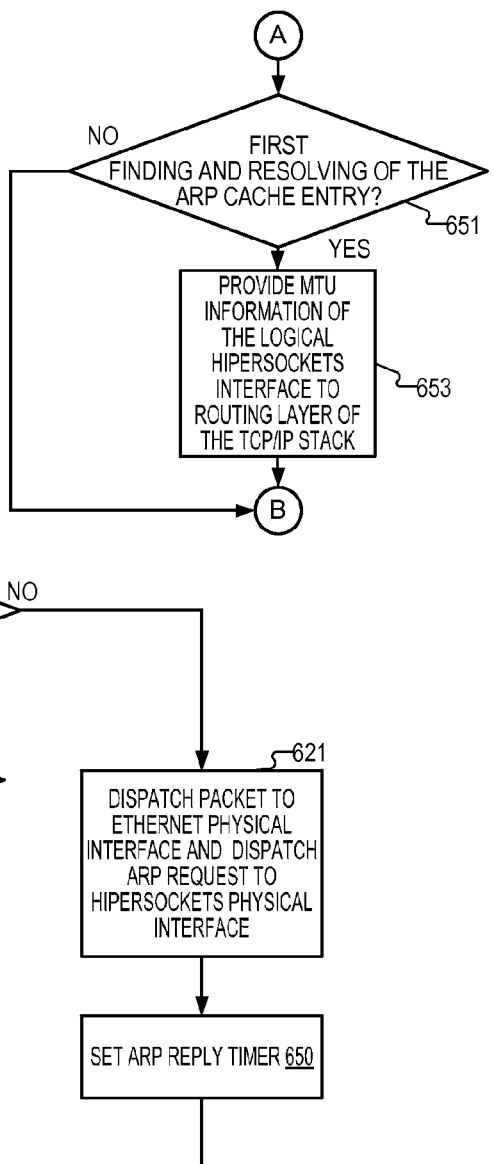
*FIGURE 6A*  *FIGURE 6B*

TRANSPARENT HETEROGENOUS LINK PAIRING

CROSS-REFERENCE TO RELATED APPLICATIONS

This application is related to commonly assigned and copending U.S. patent application Ser. No. 13/155,153 entitled "VIRTUAL NETWORK CONFIGURATION AND MANAGEMENT,".

BACKGROUND

The present invention relates generally to a computer implemented method, data processing system, and computer program product for sending and receiving packets over plural packet networks. More specifically, the present invention relates to using dissimilar networks to enhance I/O throughput over the throughput permissible by a single network.

Network latency, the time that it takes for data, such as a data packet, to travel from a source to a destination, can be a serious problem in a computing or network environment. A packet is a payload and routing information, including overhead metadata. For example, network latency can be a significant factor in transactions that require an exchange of lengthy sequences of request response flows before the transaction completes. Unacceptably high network latency can have a negative impact on the overall performance of a network.

Network latency concerns can be of particular concern in mainframe computing environments. Mainframes are designed to handle very high volume input and output (I/O) which often comes over a network. IBM's System z series (e.g. zEnterprise) includes a physical Ethernet port and corresponding network interface card (NIC) that are integrated into a single network adapter called the open systems adapter (OSA). Certain OSA include a single processor and associated storage and I/O facilities that enable it to interface with the host and the network. Thus, the OSA provides the host with access to the external network (such as a LAN) and similarly facilitates communications from the network to the host.

Accordingly, improvements and remedies are needed.

BRIEF SUMMARY

The present invention provides a computer implemented method, system and computer program product for managing at least two physical links. A TCP/IP stack configures a first interface with attributes. The TCP/IP stack activates the first interface. The TCP/IP stack detects a channel path identifier (CHPID). The TCP/IP stack creates a second interface. The TCP/IP stack associates the second interface with the first interface. The first interface and the second interface are logically linked to exchange traffic corresponding to a single internet protocol address. The TCP/IP stack configures the second interface with at least one attribute. The TCP/IP stack activates the second interface. The two physical links may rely on two different physical link types.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6A is a flowchart for handling a packet by a TCP/IP stack from an application in accordance with an illustrative embodiment of the invention;

FIG. 6B is an optional flow for handling new address resolution protocol (ARP) cache entries in accordance with an illustrative embodiment of the invention;

DETAILED DESCRIPTION

Figure 1:
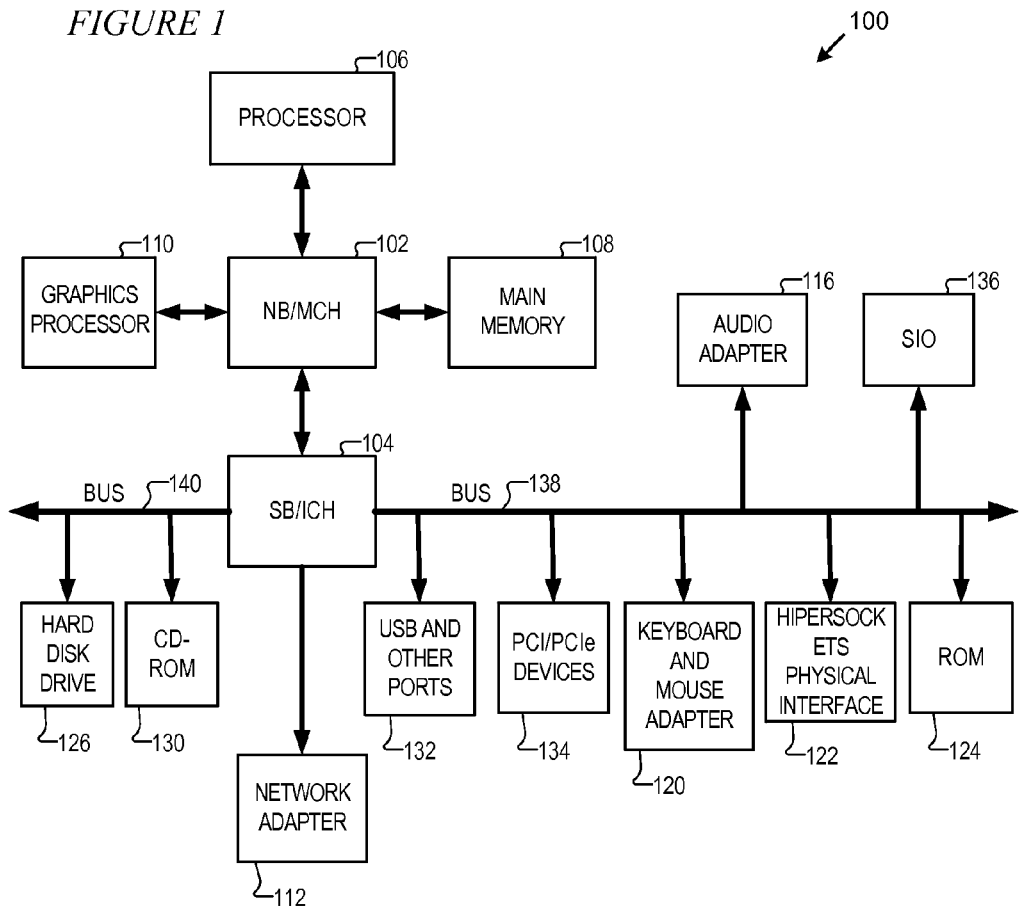
FIG. 1 is a block diagram of a server in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, network adapter 112 connects to south bridge and I/O controller hub 104 and audio adapter 116, keyboard and mouse adapter 120, HiperSockets™ physical interface 122, read only memory (ROM) 124, hard disk drive (HDD) 126, CD-ROM drive 130, universal serial bus (USB) ports and other ports 132, and PCI/PCIe devices 134 connect to south bridge and I/O controller hub 104 through bus 138 and bus 140. HiperSockets is a trademark of International Business Machines Corporation. HiperSockets is also known as internal queued direct input/output (IQDIO). PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on computer readable tangible storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a HiperSockets physical interface or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments permit users to benefit from the use of two physical interfaces that operate at different speeds to route packets between servers of a central processing complex (CPC) as well as among servers beyond the CPC that rely on two networks that are coupled to the physical interface. A central processor complex (CPC) is a frame of mechanical supports and electrical connectors that provide rigid paths along which components of the data processing system may communicate. Further, traffic between servers on the same CPC can use the faster speed interface without requiring additional hands-on configuration changes. As such, devices that transport packets between themselves can accomplish raw data rates that are higher than the use of either physical network alone. Further, one or more embodiments can divert streams of data from a server to a HiperSockets physical interface, and use a maximum transmission unit (MTU) for that HiperSockets physical interface that exceeds the MTU applicable to the Ethernet physical interface for that server. In other words, the use of a physical network can be a CPC backplane that may use jumbo frames larger than 9000 bytes. A MTU is the size (in bytes) of the largest protocol data unit.

Figure 2:
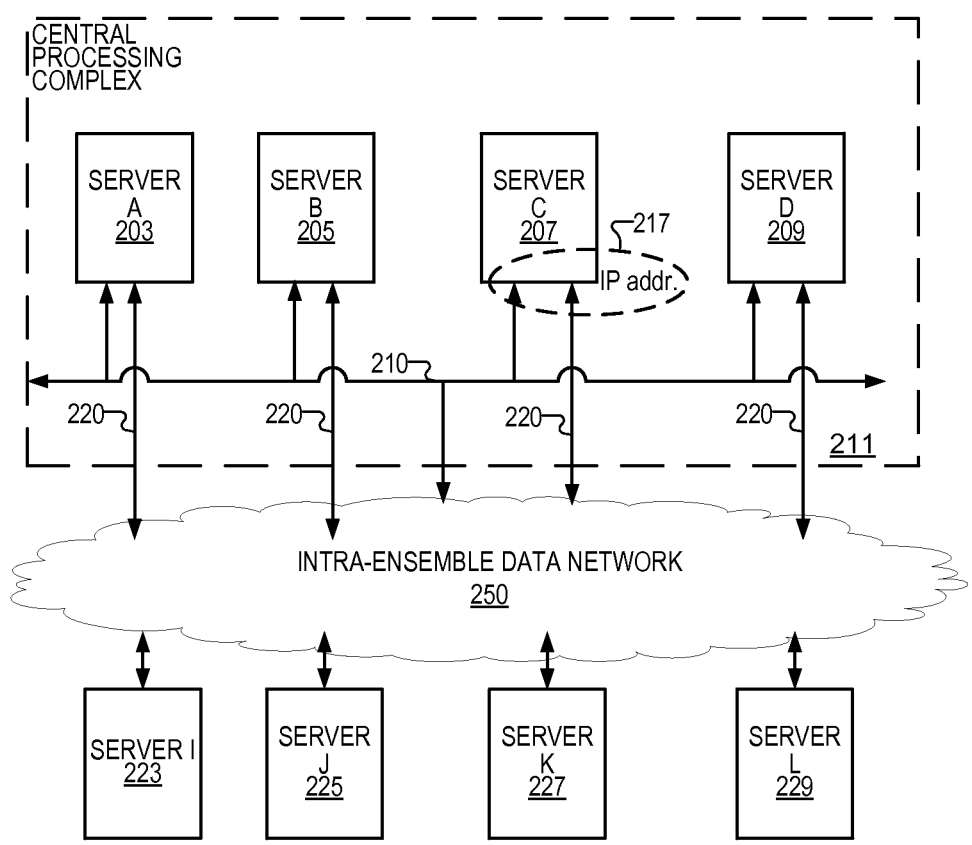
FIG. 2 is a central processor complex in accordance with an illustrative embodiment of the invention.

FIG. 2 is a central processor complex in accordance with an illustrative embodiment of the invention. Central processing complex (CPC) 211 is a frame of shelves, backplanes, power mains and the like that supports, in this example, four servers, namely server A 203, server B 205, server C 207 and server D 209. Each server can be according to data processing system 100 of FIG. 1. Each server may interconnect using the intra-ensemble data network (IEDN) 250 over the external network 220, using, for example, Ethernet adapters. An external network may be, for example, an Ethernet network according to the IEEE 802.3 series of standards. In addition, servers which are on the same CPC may interconnect using the internal network 210 (which is a subset of the IEDN) over HiperSockets interfaces. An internal network may be, for example, a HiperSockets network. A server, such as server C 207, may connect to other servers using the distinct media of external network 220 or internal network 210. The server can select which among the two networks, for example, selecting the internal network, if a target server is present in the same CPC as the source server and selecting the external network when the target server is not present in the same CPC. In either case, the server may identify itself as using a single IP address (IP address 217) regardless of the physical interface to the Ethernet (external) or HiperSockets (internal) network. A target server is the destination to which a packet is directed. A target server is also known as a destination server. A source server is an originating point for a packet. An intra-ensemble data network (IEDN) is a network of servers that connect using Ethernet physical interfaces. The intra-ensemble data network may rely only on a planar media to distribute packets amongst nodes of the IEDN. A planar medium can consist of physical conductors that are not twisted. A planar medium can include backplanes, connectors, ribbon cables and bundled cables. In contrast, the Ethernet media, as may be used with an external network, may rely on twisted pairs of cables or planar media within a frame of the CPC. A twisted pair medium is any cabling that has at least one pair of conductors that transpose position at least twice along the length of the cable. Thus, benefits can accrue when two HiperSockets physical interfaces are present on a common planar medium such as, for example, a backplane within a central processing complex (CPC). In such a configuration, embodiments of the invention can transparently use a higher speed HiperSockets connectivity, if it is available at both the source server and the destination server (or target server), and the servers are reliant on the common planar medium. In contrast, to the extent that a stream is to be transported from a server within a CPC to one located outside the CPC, the stream can be transported as Ethernet packets via the IEDN 250 according to an MTU setting that is smaller than if the stream relied on a HiperSockets interface.

A HiperSockets physical interface may be a bus connector that relies on device drivers on corresponding servers, as explained in U.S. Pat. No. 6,854,021 filed Oct. 2, 2000 by Schmidt et al. for COMMUNICATIONS BETWEEN PARTITIONS WITHIN A LOGICALLY PARTITIONED COMPUTER, owned by the assignee of the present invention and incorporated herein by reference. The HiperSockets physical interface is identified in the hardware I/O configuration by its channel path identifier (CHPID). A CHPID is a data structure or other serial number that identifies a logical identifier of a channel. A channel is the communication to an I/O device. When the operating system or any application performs I/O to a device over a particular channel, it uses the channel's CHPID to address the physical channel port. A CHPID number is in the range from hex 00 to hex FF. The physical layer can include one or more cables according to the Cat-6 standard 802.3z standard, 802.3ab standard or similar standard. Packets on the IEDN are TCP/IP packets.

By way of the intra-ensemble data network 250, a server of CPC 211, may exchange data with servers beyond the CPC, for example, server I 223, server J 225, server K 227 or Server L 229.

Figure 3:
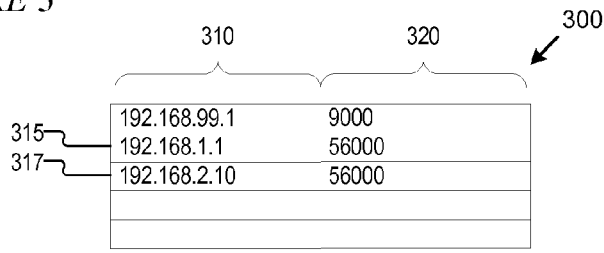
FIG. 3 is an IP address to maximum transmission unit (MTU) repository in accordance with an illustrative embodiment of the invention.

FIG. 3 is an internet protocol (IP) address to maximum transmission unit (MTU) repository in accordance with an illustrative embodiment of the invention. An IP to MTU repository is a data structure that provides a corresponding MTU for each IP address that a server uses as a correspondent for data exchange. IP to MTU repository 300 is necessary because each server can have an IP address reached using one of several networking protocols and/or media. Each protocol relies on the maximum transmission unit as a limiting factor to packet sizes. The repository may be arranged as a set of rows having two columns, whereby each row has a field corresponding to internet protocol address 310 and maximum transmission unit 320. The MTU setting may be higher than 9000 for networks that rely on HiperSockets interfaces, for example, for IP addresses 192.168.1.1 315 and 192.168.2.10 317, which are each associated with MTUs of 56000. IP to MTU to IP repository 300 gets initially populated by the TCP layer of the TCP/IP stack when it performs a route lookup. Because the stack routing table is only aware of the Ethernet interfaces on the IEDN, this initial population will only contain the smaller Ethernet MTU sizes for IEDN destinations, for example 9000. Illustrative embodiments of the invention provide a device driver layer (see step 653 in FIG. 6B) with a facility to tell the TCP layer to update the table entry (of the IP to MTU repository 300) for a certain destination (i.e. one which is reachable over HiperSockets interfaces) with a larger value than permissible for Ethernet. A larger value than permissible for Ethernet can be, for example, 56000. This facility allows the TCP layer to use this larger MTU for a subsequent TCP connection to the same destination. The IP address can be assigned to a server such that an Ethernet physical interface and a HiperSockets physical interface, explained below, can each receive packets having destination addresses matching the IP address. In other words, the respective physical media of each network may rely on separate routing mechanisms to arrive at destinations managed by a stack device driver, such as TCP/IP stack 499, explained below. Accordingly, those interfaces, in parallel, may receive packets marked with the same destination IP address. One or more of steps 605, 607 and 609 may be a resolution protocol cache lookup.

Figure 4:
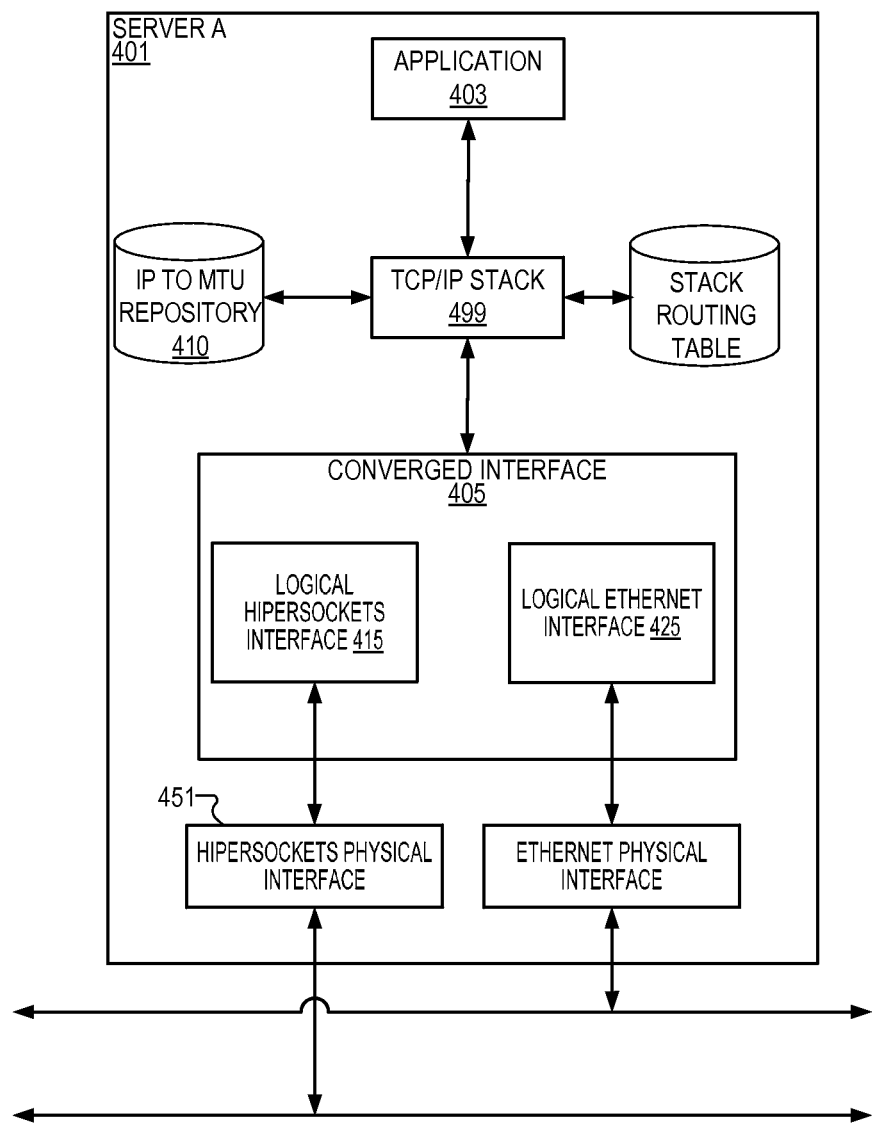
FIG. 4 is a server having a converged interface in accordance with an illustrative embodiment of the invention.

FIG. 4 is a server having a converged interface in accordance with an illustrative embodiment of the invention. FIG. 4 depicts the operation of converged interface 405 within server A 401, which is shown as server A 203 in FIG. 2. Server A hosts application 403. An application is an executing program that uses the resources of a data processing system. Application 403 may require use of a network, either to transmit data, to consume data, or both. Application 403 uses TCP/IP stack 499 (or stack device driver) to transmit and receive streams of data in an asynchronous manner. Accordingly, the application makes function calls to the network functions in the conventional manner, and access to such networking functions occurs in a manner transparent to application 403. Any changed addressing, packet sizing, etc. between HiperSockets and Ethernet interfaces is managed by TCP/IP stack 499. A converged interface is controlled by the TCP/IP stack 499 (a stack device driver) that operates in coordination with a HiperSockets physical interface and an Ethernet physical interface to connect to two physical networks concurrently. Accordingly, the TCP/IP stack creates and/or manages a logical construct of logical HiperSockets interface and logical Ethernet interface. The logical HiperSockets interface is the data structures, buffers and routines used to assemble packets, disassemble packets, issue errors, respond to errors, in connection with packets placed onto a CPC backplane through the HiperSockets physical interface. In contrast, the HiperSockets physical interface is the connector and/or circuit board traces that carry signals on the CPC backplane and daughter boards.

A physical network is a network that uses conduits to carry electromagnetic signals, such as, for example, a pair of wires or a fiber optic cable. The TCP/IP stack determines whether the source server (or source IP address for a packet) is on the same CPC as the destination server or destination IP address, and selects to use the HiperSockets interface in response to such a determination. In contrast, the TCP/IP stack, if it determines the source server is in a different CPC than the destination server, it selects the Ethernet logical interface and Ethernet physical interface to transport packets between the source server and the destination server.

TCP/IP stack 499 may use information recorded to IP to MTU repository 410 to set the size of packets that the TCP/IP stack assembles in preparation for transmittal over one of the networks. IP to MTU repository 410 is IP to MTU repository 300 of FIG. 3. By the time the outbound packets reach converged interface 405, the MTU has already been used to determine the packet size. Embodiments of the invention permit the converged interface 405, in coordination with logical Ethernet interface 425, to feed that information back up to the TCP/IP stack 499 (see box 653 of FIG. 6B) so that it can update the MTU repository with a larger MTU for that IP address. Accordingly, the TCP layer of the stack can use this information on a subsequent TCP connection to the same IP address. As such, the TCP layer may override the smaller MTU from the stack routing table. Converged interface 405 may use two physical interfaces, namely, a network adapter and a HiperSockets physical interface 451. The network adapter may be network adapter 112 of data processing system 100 in FIG. 1. Similarly, the HiperSockets physical interface may be HiperSockets physical interface 122 in FIG. 1, which permits access from a HiperSockets physical interface to any other HiperSockets physical interface that shares the same physical medium within a CPC. In contrast, the network adapter may connect to both servers that are in the same CPC with the source server, as well as servers reachable outside of the CPC via the IEDN. TCP/IP stack 499 may determine, as data arrives from application 403, how to divide the stream into one of two interfaces (including the HiperSockets interface) having heterogeneous data rates and/or MTUs. For example, logical Ethernet interface 425 may have a data rate of 1,000 gigabits per second and a MTU of 9,000, while logical HiperSockets interface 415 may have a data rate of 10,000 gigabits per second and a MTU of 56,000. In such an example, the TCP/IP stack may select the logical HiperSockets interface to transmit a stream, and thus likely achieve a greater throughput of data than use of the logical Ethernet interface would allow.

As may be appreciated, in some embodiments TCP/IP stack 499 may apportion a data stream—part to a HiperSockets physical interface and part to the Ethernet physical interface.

Figure 5:
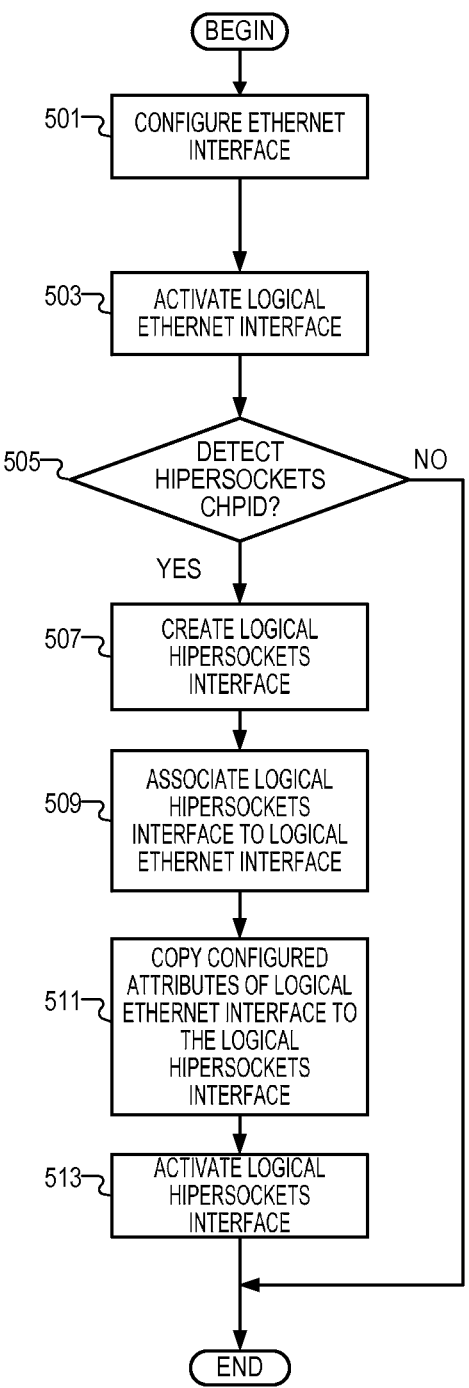
FIG. 5 is a flowchart for activating a HiperSockets interface in accordance with an illustrative embodiment of the invention.

FIG. 5 is a flowchart for activating a HiperSockets interface in accordance with an illustrative embodiment of the invention. The TCP/IP stack, within the framework of devices and application of FIG. 4, may initially configure a logical Ethernet interface (step 501). Next, the TCP/IP stack may activate the logical Ethernet interface (step 503). The logical Ethernet interface may be activated on the basis of attributes associated with the Ethernet interface earlier. Attributes are parameters of the logical Ethernet interface that permit the logical Ethernet interface to be a source for packets as well as a destination, such as, for example, an internet protocol address assigned to the logical Ethernet interface. When a field in a data structure for the logical Ethernet interface is filled with valid data, the attribute is a configured attribute. All configured attributes are attributes. Activating can include the TCP/IP stack exchanging internet protocol addresses with a router or other network infrastructure and negotiating a connection speed. In addition, the TCP/IP stack may also register a configured virtual local area network identifier (VLAN ID) with the Ethernet adapter. Further, the TCP/IP stack may detect whether a HiperSockets CHPID is present (step 505). The CHPID may be previously set by a technician who manages the hardware I/O configuration. Accordingly, the technician may have set the configuration attribute to designate whether a specific CHPID can be used on the IEDN. It is this CHPID attribute that the TCP/IP stack uses to determine if the CHPID is present. If no CHPID is detected, processing may terminate.

On the other hand, if a positive result occurs, the TCP/IP stack may create a logical HiperSockets interface (step 507). Next, the TCP/IP stack converged interface may associate the logical HiperSockets interface to the logical Ethernet interface (step 509). Associating the logical HiperSockets interface to the logical Ethernet interface can include setting up at least one buffer that logical Ethernet interface 425 and logical HiperSockets interface 415 use to either fill outgoing packets or assemble incoming data payloads for further processing. In addition, the logical HiperSockets interface and logical Ethernet interface are logically linked to exchange traffic corresponding to a single internet protocol address. Exchanging includes transmitting or receiving packets. A single IP address is an IP address according to either of the IPv4 or IPv6 protocols. Moreover, a single IP address is an IPv4 IP address, and IPv6 IP address or a combination of IPv4 IP address and IPv6 IP address.

Next, the TCP/IP stack copies configured attributes of the logical Ethernet interface to the logical HiperSockets interface (step 511). Configured attributes include, for example, IP addresses and virtual local area network identifier (VLAN ID) copied from the logical Ethernet interface. Accordingly, the first interface and the second interface are logically linked to share traffic corresponding to a single internet protocol address. Next, the TCP/IP stack activates the logical HiperSockets interface (step 513). During activation, the TCP/IP stack may register the VLAN identifier (VLAN ID) with the HiperSockets firmware. In addition, the TCP/IP stack may obtain a virtual media access control (VMAC) address from the HiperSockets firmware. Furthermore, the TCP/IP stack can maintain a control block for each physical interface, including the HiperSockets interface. Upon successful activation of the logical HiperSockets interface, the TCP/IP stack may update a state field in that control block to represent ACTIVE. Processing may terminate thereafter.

FIG. 6A is a flowchart for handling a packet by a TCP/IP stack from an application in accordance with an illustrative embodiment of the invention. Initially, a packet dispatch is requested by an application and route lookup indicates Ethernet interface on IEDN (step 601). In other words, the TCP/IP stack may receive a packet dispatch request from the application. A packet dispatch request includes at least an identifier of data to be transmitted and an indication, potentially implicit from previous packet dispatch requests, of the destination to send the data. An application can be, for example, application 403 of FIG. 4. A packet dispatch request can include a stream of data submitted to the TCP/IP stack by a function call. The route lookup can identify that the IEDN supports the Ethernet physical interface.

Next, the TCP/IP stack may determine if the corresponding logical HiperSockets interface is active (step 603). The TCP/IP stack may perform step 603 by checking the control block for the logical HiperSockets interface for an active setting. If the logical HiperSockets interface is not active, the TCP/IP stack dispatches the packet, or at least the payload for a packet, to the Ethernet physical interface (step 611). However, in response to the logical HiperSockets interface being active, the TCP/IP stack may perform an address resolution protocol (ARP) cache lookup on the logical HiperSockets interface (step 605). ARP is a full featured resolution protocol used to match IP addresses to underlying data link layer addresses. The use of ARP permits internet protocols to operate over a variety of open system interconnections (OSI) layer 2 technologies. ARP may be as defined in request for comments (RFC) 826, incorporated by reference herein.

Next, the TCP/IP stack may determine if the ARP cache entry is found (step 607). The TCP/IP stack performs this step by traversing resolution protocol cache. A resolution protocol cache is a data structure local to the TCP/IP stack of addresses in the local area network. The resolution protocol cache contains at least one cache entry. The cache entry includes fields for at least an IP address, MAC address (i.e. data link layer address), VLAN ID, etc. In the case of logical HiperSockets interface, the MAC address is a virtual MAC address (VMAC). If the ARP cache entry is found, the TCP/IP stack may determine if the ARP cache entry is resolved (step 609). An ARP cache entry is resolved when a cache includes the hardware address corresponding to an IP address. A negative determination causes processing to continue at step 611. Otherwise, the TCP/IP stack may determine whether this is the first time that the ARP cache entry was found and/or resolved (step 651).

If step 651 is positive, the TCP/IP stack provides MTU information of the HiperSockets interface to the routing layer of the TCP/IP stack (step 653). Otherwise, the TCP/IP stack skips this step.

Next, the TCP/IP stack dispatches the packet to the HiperSockets physical interface (step 613). The HiperSockets physical interface can be HiperSockets physical interface 122 of FIG. 1. Dispatching can include, for example, allocating a payload size to a packet and placing a header and other overhead data into the packet for transmission according to the physical layer's requirements.

If, at step 607 an ARP cache entry is not found, the TCP/IP stack may dispatch the packet to the Ethernet physical interface, and dispatch an ARP request to the HiperSockets physical interface (step 621). Next, the TCP/IP stack may set an ARP reply timer (step 650). The ARP reply timer may be referenced again at the flowchart in FIG. 7, below. Processing may terminate thereafter.

FIG. 6B is an optional flow for handling new address resolution protocol (ARP) cache entries in accordance with an illustrative embodiment of the invention. The steps of FIG. 6B may follow from a positive determination at step 609 of FIG. 6A. Initially the TCP/IP stack determines if the TCP/IP interface is at a point where it is first finding and resolving an ARP cache entry (step 651). If not, processing continues to step 613, or 'B'. Otherwise, in case of a positive result, the TCP/IP stack provides MTU information of the logical HiperSockets interface to a routing layer of the TCP/IP stack (step 653).

Figure 6C:
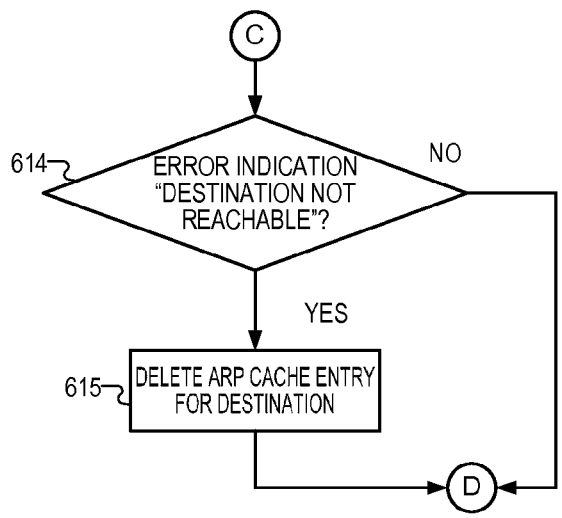
FIG. 6C is a flowchart for further processing after step 613 of FIG. 6A.

FIG. 6C a flowchart for an optional flow for further processing after step 613 of FIG. 6A. After step 613, the TCP/IP stack may determine if it received an error indication indicating that the destination is not reachable (step 614). If step 614 is positive, the TCP/IP stack may delete the ARP cache entry for the destination to which the packet refers (step 615). Processing may terminate thereafter. If step 614 is negative, the TCP/IP stack may resume at connector 'D' in FIG. 6A. It may be appreciated that without the option of FIG. 6C, step 613 may follow in response to a positive determination of step 609 in FIG. 6A.

Figure 7A:
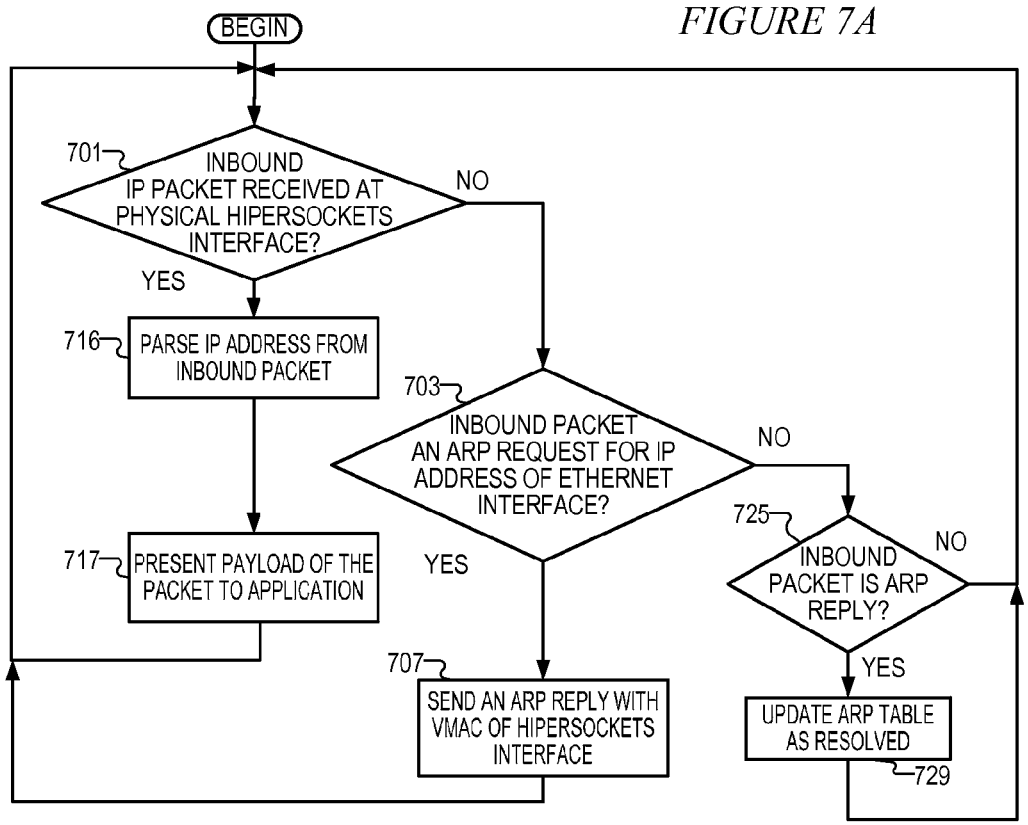
FIG. 7A is a flowchart for handling a packet by a TCP/IP stack from a physical HiperSockets interface in accordance with an illustrative embodiment of the invention.

FIG. 7A is a flowchart for handling a packet by a TCP/IP stack from a physical HiperSockets interface in accordance with an illustrative embodiment of the invention. Initially, the TCP/IP stack determines if an inbound IP packet is received at the physical HiperSockets interface (step 701). If not, the TCP/IP stack determines whether the inbound IP packet is an ARP request for the IP address of the Ethernet interface (step 703). If step 703 is positive, the TCP/IP stack sends an ARP reply with the virtual media access control (VMAC) of the HiperSockets interface (step 707). Following step 707 processing may resume at step 701.

Following step 701's positive result, the TCP/IP stack may parse the IP address for the inbound packet (step 716). Next, the TCP/IP stack may present the payload of the packet to the application (step 717). Subsequently, processing may resume at step 701.

Following a negative outcome to step 703, the TCP/IP stack determines if the inbound packet is an ARP reply (step 725). If so, the TCP/IP stack may update the ARP table as resolved (step 729) with respect to the HiperSockets physical interface. After step 729, or if the result of step 725 is negative, processing may cycle back to step 701.

Figure 7B:
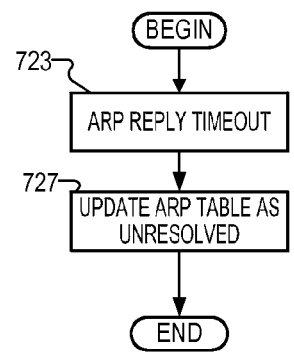
FIG. 7B is a flowchart for handling ARP reply timeouts by a TCP/IP stack from a physical HiperSockets interface in accordance with an illustrative embodiment of the invention.

FIG. 7B is a flowchart for handling ARP reply timeouts by a TCP/IP stack from a physical HiperSockets interface in accordance with an illustrative embodiment of the invention. Initially, the TCP/IP stack may determine if an ARP reply timer is expired (step 723). The ARP timer may expire on the basis of a previous timer setting—see for example, step 650 of FIG. 6A. If the ARP timer expired, the TCP/IP stack may update the ARP table as unresolved (step 727). Processing terminates thereafter.

Further illustrative embodiments may permit a TCP/IP stack to periodically detect the absence of corresponding server nodes. In other words, when a final corresponding Ethernet interface becomes inactive the TCP/IP stack may deactivate the HiperSockets which it manages, for example, by removing any VLAN identifier association formerly associated with the HiperSockets interface.

The illustrative embodiments permit a TCP/IP stack inheriting configurations of an Ethernet interface. By use of independent networks that permit dual packet delivery between two devices, the illustrative embodiments permit greater throughput than packets sent inter-CPC network would allow. Accordingly, choosing to send from a server within a central processing complex (CPC) to another server of the same CPC operates to send a packet to a server located in a CPC that houses the first interface and the second interface such that the packet carries data at a higher throughput than a packet sent from the central processing complex. The operation of the hybrid network can be transparent to applications that rely on a TCP/IP stack. The application merely needs to use TCP/IP designations of source and destination with respect to data streams delivered to and received from the TCP/IP stack. Accordingly, some efficiencies can be achieved in that less overhead is required in reliance on greater than a MTU stetting of 9000.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing at least two physical links, the computer implemented method comprising:

configuring a first interface with attributes;
activating the first interface;
detecting a channel path identifier (CHPID);
creating a second interface;
associating the second interface with the first interface, wherein the first interface and the second interface are logically linked to exchange traffic corresponding to a single internet protocol address;

configuring the second interface with at least one attribute;

responsive to detecting the channel path identifier, copying configured attributes of the first interface to the second interface, wherein the first interface is a logical Ethernet interface, and the second interface is a logical HiperSockets interface; and activating the second interface.

2. The computer implemented method of claim 1, wherein the first interface operates at a maximum transmission unit (MTU) smaller than a MTU of the second interface.

3. The computer implemented method of claim 1, further comprising sending a packet to a server located in a central processing complex that houses the first interface and the second interface such that the packet carries data at a higher throughput than a packet sent from the central processing complex.

4. The computer implemented method of claim 1, wherein the second interface is logical HiperSockets interface.

5. The computer implemented method of claim 1, wherein the single internet protocol address is an IPv4 internet protocol address and an IPv6 internet protocol address.

6. The computer implemented method of claim 1, wherein the second interface comprises a logical HiperSockets interface.

7. The computer implemented method of claim 1, for transmitting a plurality of packets, the computer implemented method further comprising:

receiving a packet dispatch request from an application, subsequent to activating the second interface;

determining that a logical HiperSockets interface is active and that the logical HiperSockets interface is the second interface;

responsive to a determination that the logical HiperSockets interface is active, performing a resolution protocol cache lookup on the logical HiperSockets interface;

determining whether the resolution protocol cache contains an address resolution protocol (ARP) cache entry for the logical HiperSockets interface;

responsive to a determination that the resolution protocol cache contains the ARP cache entry, determining whether the address resolution protocol cache entry is resolved; and responsive to a determination that the ARP cache entry is resolved, dispatching the packet to a physical interface.

8. The computer implemented method of claim 7, wherein the physical interface is a HiperSockets physical interface.

9. The computer implemented method of claim 7, further comprising:

receiving a second packet dispatch request from an application;

responsive to receiving the second packet dispatch request, determining whether the resolution protocol cache contains an address resolution protocol (ARP) cache entry for the logical HiperSockets interface; and responsive to a determination that the resolution protocol cache does not contain the ARP cache entry for the logical HiperSockets interface, dispatching a packet to an Ethernet physical interface.

\* \* \* \* \*